United States Patent [19]
Christensen et al.

[11] 3,777,830
[45] Dec. 11, 1973

[54] STABILITY-PRESERVING STEERING SUSPENSION FOR SNOWMOBILES

[75] Inventors: Frank G. Christensen, Don Mills, Ontario; Rafael T. Wulff, Dorset, Ontario, both of Canada

[73] Assignee: Zeverly L. Lapin, Los Angeles, Calif.

[22] Filed: Mar. 20, 1972

[21] Appl. No.: 236,353

[52] U.S. Cl. .................. 180/5 R, 280/21 A, 280/25
[51] Int. Cl. ............................................. B62m 27/00
[58] Field of Search .............................. 180/5 R, 6; 280/21 R, 25, 96.2 R

[56] References Cited
UNITED STATES PATENTS

| | | | |
|---|---|---|---|
| 3,650,341 | 3/1972 | Asmussen | 180/5 R |
| 3,481,416 | 12/1969 | Caron | 180/5 R |
| 3,530,950 | 9/1970 | Lamb | 180/5 R |
| 2,149,895 | 3/1939 | Maruhn | 280/96.2 R |
| 3,480,096 | 11/1969 | Hammitt | 180/5 R |
| 3,623,563 | 12/1970 | Gosfomski | 180/5 R |

OTHER PUBLICATIONS

Recreational Vehicle Business, Page 60, Minneapolis, Minn., May 1971.

*Primary Examiner*—Richard J. Johnson
*Attorney*—Jerome A. Gross

[57] ABSTRACT

A stability-preserving, self-banking steering suspension for snowmobiles. In the preferred embodiment, the steering bushings are held by parallel leaf springs deflectable in an upward and aft sloping lateral plane. Steerable ski legs extend inboard to trunnion brackets which are mounted directly to the skis. Spring deflection under impacts does not lessen the steering stability, as may occur when the skis alone are sprung.

2 Claims, 5 Drawing Figures

STABILITY-PRESERVING STEERING SUSPENSION FOR SNOWMOBILES

CROSS-REFERENCES TO RELATED APPLICATION

This invention relates to the subject matter of our prior United States patent application, Ser. No. 170,762 filed Aug. 11, 1971 entitled "Improved Steering System for Snowmobiles and the Like." To the extent of common subject matter there disclosed, the priority of its said filing date is claimed.

BACKGROUND OF THE INVENTION

Our co-pending application discloses a self-banking steering suspension for snowmobiles and other vehicles. Said application generally discloses steerable means which extend downward from and inboard of the lower ends of steering shafts, to trunnion brackets spring-mounted on semi-elliptic springs mounted to the forward skis. The geometry there shown provides the advantages of stability and self-banking, as there described.

With the forward skis so conventionally mounted on semi-elliptic springs, their deflection under impacts so varies the geometry of the steering system as to lessen its stability. Such lessening of stability is always undesirable; and lack of stability is more likely to be critical at times when springs are deflected, for example as in a turn when the large part of the weight is transferred to the outboard ski.

SUMMARY OF THE INVENTION

A principal purpose of the present invention is to preserve the stability of steering, as in snowmobiles, despite spring deflectance. A further purpose is to take full advantage of the inherent stability provided in the steering system of our said co-pending application, by removing from the steering geometry the effects of deflectance. A still further purpose is to provide a steering suspension which is sprung as a whole. Further purposes will be apparent from the disclosure hereof.

We achieve these objects generally by suspending the front end of the vehicle, perferably a snowmobile, substantially at its center, by pairs of support arm means which may, in the simple preferred embodiment, be parallel springs, cantilever-mounted to extend outboard from the central vertical plane of symmetry of the vehicle, and characterized by spring resilience in an upward and aft sloping plane. Tubular steering bushings are mounted to their outboard ends, to establish steering axes in the plane of deflectance. Each shaft has, beneath its bushing, means to mount a ski. The preferred means is a simple downward and inward extending ski leg, having at its lower end a lateral trunnion bracket to which the ski is directly mounted. Impacts on each ski will be absorbed by the resilient deflection of its support arm means, without affecting the steering stability afforded by the geometry of the system.

DESCRIPTION OF THE PREFERRED EMBODIMENT

Figure 3:
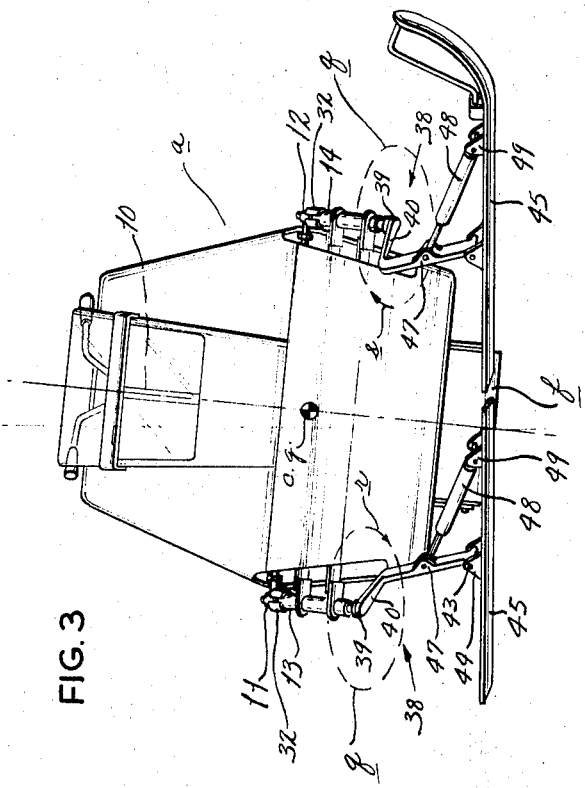
FIG. 3 is a front elevation showing the inward tilt of the snowmobile in a turn.
Figure 2:
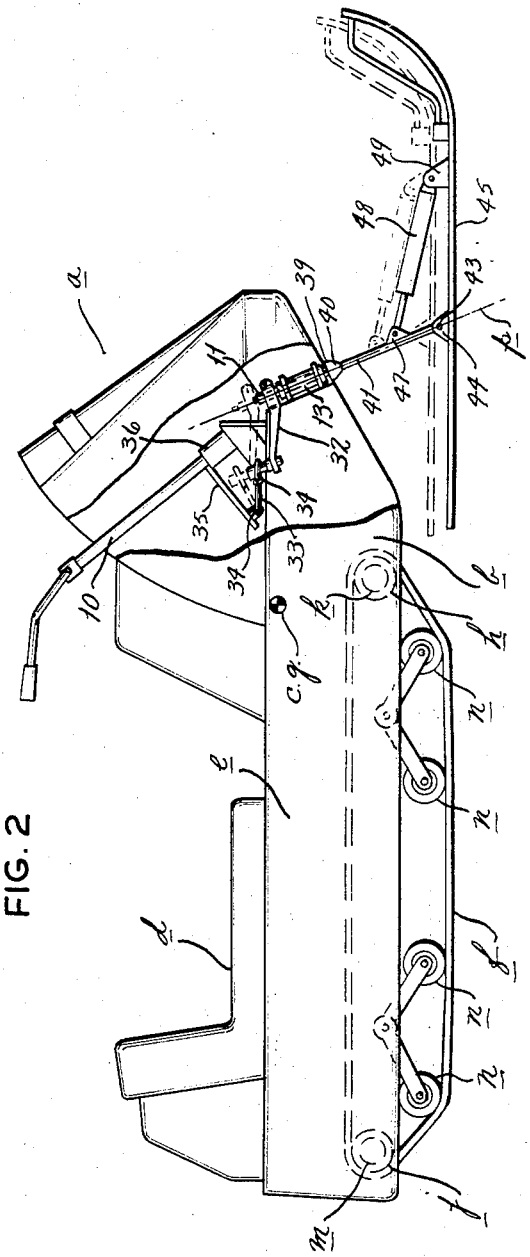
FIG. 2 is a side elevation thereof, with portions similarly broken away. The dashed lines indicate the deflected position of the steering suspension.
Figure 1:
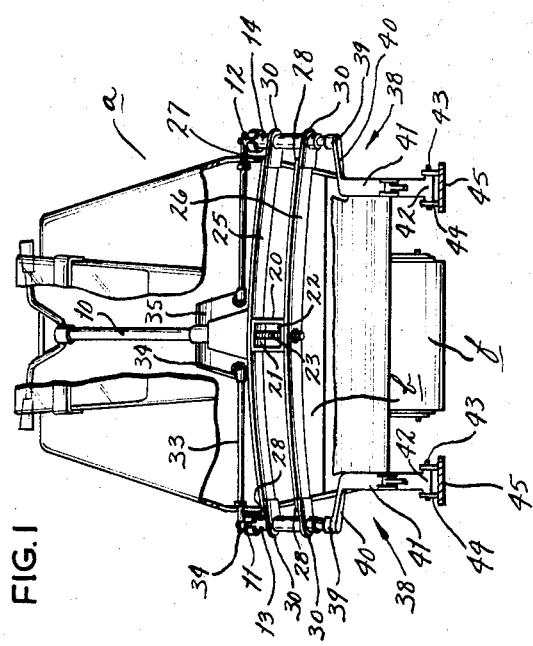
FIG. 1 is a front elevational view of a snowmobile embodying the present invention, with portions of the body and skis broken away to show the present steering suspension.

A snowmobile, conventional except for the steering suspension of the present invention, is shown in FIGS. 1, 2 and 3. The vehicle, generally designated $a$, has conventional rigid structure $b$ and an internal combustion engine, not shown. The approximate location of its center of gravity is shown by the cross-shaded circle symbol designated c.g. shown in FIGS. 2 and 3. An upholstered driver's seat $d$ is mounted on a longitudinally central mechanism enclosure $e$. The aft portion of the vehicle $a$ is supported on a driving belt $f$, located symmetrically with respect to the fore-and-aft center line of the vehicle. The belt $f$ runs around a conventional engine-driven sprocket $h$ and rear sprocket $j$, mounted respectively on forward and aft shafts $k$, $m$ rigidly secured to the structure $b$ of the snowmobile and tiltable with it. A set of resiliently supported bogie wheels $n$ between the forward and aft shafts $k$, $m$ are shown schematically.

In the present steering system, control is exerted through a central steering column 10 connected by mechanism hereafter described to left and right steering shafts 11, 12. These are mounted in elongated bushings 13, 14 which are suspended as hereinafter described, so as to slope forward and downward, preferably in substantially parallel planes spaced symmetrically from the fore-and-aft center line of the vehicle $a$, as best shown in FIG. 1. Positioned by the sloping bushings 13, 14, the axis $p$ of each of the steering shafts 11, 12 slopes forward and downward as shown in FIG. 2.

A preferred suspension means is shown in FIGS. 1, 2 and 3. Rigidly secured to the forward part of the structure $b$ (otherwise not shown in detail) at the central, vertical plane of symmetry of the vehicle to project slopingly forward and upward therefrom, is a short box-like structural member 20 whose forward end may be open as shown in FIG. 1. The box-like structural member 20 has parallel upper and lower surfaces 21 and 22. Onto the upper surface 21 and lower surface 22 are bolted, as by the bolt 23, substantially parallel upper and lower leaf springs 25, 26. Preferably these bend downward slightly when unloaded, so as to be substantially flat when the vehicle is loaded. The bolt 23 serves to mount the springs 25, 26 so that they cantilever outward from the central plane of symmetry of the vehicle. Due to the slope of the surfaces 21, 22, their spring resilience functions in an upward and aft sloping plane, in which both will deflect. The amount of this deflectance, as shown in FIG. 2, is relatively small compared to the length of the springs 25, 26 measured from their central mounting point. Since the springs 25, 26 are relatively flat under ordinary loads, the lateral movement of their outboard ends accompanying such deflectance is minimal.

The outboard ends 27, 28 of the springs 25, 26 are rigidly secured, as by brazing or other conventional means, to mounting plates 30 extending inward from the upper and lower ends of bushings 13, 14. Due to the essential parallelism of the springs 25, 26, these bushings 13, 14 will deflect in the sloping plane which has been described and the steering axes $p$ will remain in such plane regardless of the spring deflectance.

Within the steering bushings 13, 14, the steering shafts 11, 12 are mounted for turning movement, with their ends extending above and below the bushings 13, 14. Onto their upper ends are mounted steering arms 32 best seen in FIG. 2. From the steering arms 32, steering link rods 33, having ends 34 equipped with ball joints or other deflectance-permitting means, extend inward to connect to the arms of a double bell crank 35 secured to the central steering column 10 adjacent to its base bearing 36, all as best seen in FIG. 2.

At the lower ends of the steering shafts 11, 12 beneath the bushings 13, 14, each has means to mount a ski. In the embodiment illustrated this means is a rigid ski leg generally designated 38. Each ski leg 38 includes a shaft connector 39 secured to the lower ends of the shafts 11, 12 respectively, an inward extending portion 40 which preferably slopes somewhat downward, and a lower leg portion 41 terminating in a broadened lower end 42 in which a lateral trunnion pin 43 is mounted. A lateral trunnion bracket 44, which engages the ends of the trunnion pin 43, is secured directly to the upper surface of left and right skis 45. Spacedly above its lower end 42, each of the lower leg portions 41 has a forward projecting bracket 47 from which a shock strut 48 extends forwardly and downward to a strut mounting bracket 49, positioned on each ski 45 forward of the trunnion bracket 44. The shock struts 48 serve to permit controlled pivoting of the skis 45 about their trunnion pins 43.

Attention is directed now to FIG. 3. On turning the steering column 10, the steering shafts 11, 12 are rotated in canted planes $q$. This would bring the left ski 45 aft and somewhat downward (assuming the vehicle $a$ was suspended) as shown by the arrow $r$ and the right ski forward and somewhat upward, as shown by the arrow $s$. Since the vehicle $a$ is not suspended, the vehicle $a$ tilts as shown in FIG. 3. Thus the vehicle is banked while turning and its c.g. is brought inward of the center plane of symmetry to increase its resistance to overturning.

This favorable inward banking effect was obtained also in the steering suspension disclosed in my said copending application. As there noted, banking the vehicle has a significant effect on the driving belt $f$ aft of the center of gravity. Being mounted on forward and aft shafts $k$, $m$ which tilt with the body $b$, the belt $f$ will also tilt with the snowmobile $a$. As it tilts on turning, as illustrated in FIG. 3, the lower edge of the belt $f$ on the outer side of the turn is raised slightly from the surface.

Raising the outer edge of the belt $f$ lessens the tendency of such vehicles to understeer erratically. Such understeering appears to be due in part to forces exerted inward against the outer edge of the driving belt on turns. These forces, which may be considered as centripetal, vary somewhat with the smoothness of the surface. They act aft of the center of gravity of the vehicle, and tend to rotate it about its center of gravity in an understeering sense. This undesirable tendency is reduced by the present banking which raises the belt outer edge, so that such inward forces act only on the belt undersurface rather than on its edge.

Figure 4:
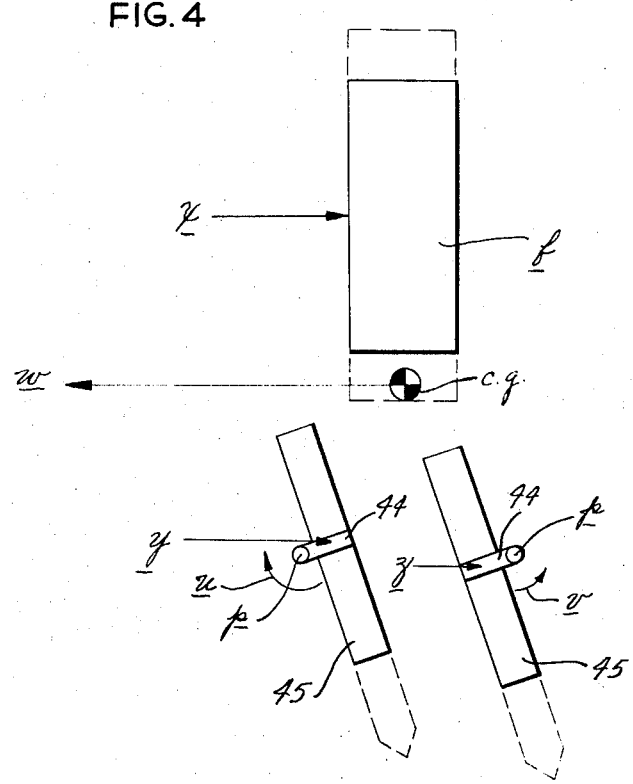
FIG. 4 is a schematic view showing the forces acting in a turn.

Referring now to FIG. 4, this schematic view shows positions of the skis 45 and the driving belt $f$ as they contact the snow surface while so turning. The centrifugal force $w$ is shown acting outward at the center of gravity of the vehicle. It is counteracted by three inward-acting forces: the force $x$ at the driving belt aft of the center of gravity, and the forces $y$ and $z$ at the trunnion centers of the left and right skis respectively. Assuming that the vehicle is not skidding outward, these inward-acting forces will equal the outward-acting centrifugal force $w$.

The centrifugal force $w$ acts outward at the vehicle center of gravity spacedly above the snow surface; its tendency to overturn the vehicle shifts an increased part of its weight to the outer ski, here shown at the left, decreasing the portion of the weight born by the inner ski. The inward forces $y$ and $z$ acting in a turn on the skis will be substantially proportionate to the weight distribution between them; that is, the inward force $y$ on the outer ski will be greater than the force $z$ on the inner ski, and this difference will increase with the centrifugal force $w$.

Due to the inward extension of the ski legs 38, the centripetal forces $y$, $z$ have moment arms, as can be seen from FIGS. 3 and 4, which increase substantially as the sine of the angle of turning. FIG. 4 illustrates that the point of application of the larger force $y$ will be behind the steering axis $p$ of the left ski 45; while the point of application of the smaller force $z$ will be forward of the right side steering axis $p$. Considering the curved arrows shown in FIG. 4, the longer curved arrow $u$ at the left ski represents the relatively large steering moment which acts in a stabilizing (or "turn-straightening") sense on the outer ski. The shorter arrow $v$ represents the relatively smaller, de-stabilizing steering moment which acts on the inner ski. Since in a turn the weight on the outer ski will always be greater, the resultant stabilizing steering moment $u$ will be greater than the destabilizing steering moment $v$. This excess yields a positively stable net steering moment, which tends to straighten the vehicle out of turns.

The present steering suspension, in which the entire system is sprung, may now be contrasted with a conventional steering system in which semielliptic springs are affixed onto the upper surfaces of the skis. In such a system, spring deflection tends to lessen any degree of stability which might be present. The geometry of such a system may, for example, provide a degree of castering. Thus forward slanting shafts may have lateral trunnions mounted at top center of elliptic springs, so that downward extensions of the steering axes will project forward of the central load-carrying points of the skis. In such a construction, spring deflection will lessen the forward projection. Hence if a bump is hit while the snowmobile turns, the system's castering tendency will be lessened.

In the present invention, spring deflection does not affect that part of the geometry of the steering system which furnishes the stabilizing steering moment. Let it be assumed, for example, that while turning, either or both of the skis 45 may encounter a strong impact, as from hitting a bump, and be deflected substantially upward as shown in FIG. 2. This deflectance is always in the upward and aft sloping plane, in which lie the steering axes $p$. Considering FIG. 4, although such deflectance would move one or both of the steering axes $p$ slightly backward, the moment arms of the centripetal forces y, z would not be affected. Hence, despite such deflectance, the turn-straightening, or stabilizing, steering moment $u$ will maintain its excess over the destabilizing steering moment $v$. This is true whether the arm means which support the tubular bushings 13, 14 are simple leaf springs 25, 26, mounted as shown, or are more complicated means, as illustrated in FIG. 5.

Figure 5:
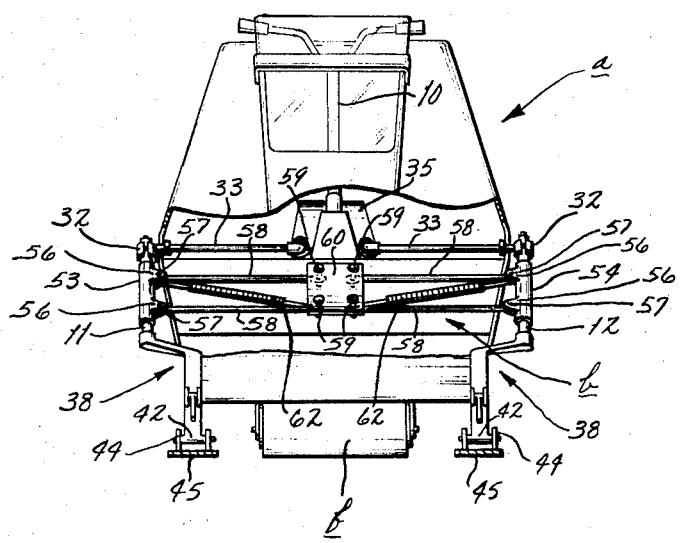
FIG. 5 is a view similar to FIG. 1 showing a modified embodiment of the invention.

The modified embodiment of the invention illustrated in FIG. 5 shows a similar snowmobile $a$ having rigid structure $b$ and driving mechanism including the drive belt $f$. A steering column 10 similarly mounts a bell crank 35 whose steering link rods 33 connect to steering arms 32 at the upper ends of left and right steering shafts 11, 12. Inward and downward extending ski legs generally designated 38 terminate in lower ends 42 mounted in trunnion brackets 44 affixed directly to the upper surfaces of left and right skis 45.

Left and right steering bushings 53, 54 in which the shafts 11, 12 turn, are generally similar to the bushings 13, 14 of the previously described embodiment. However, instead of having mounting plates 30, the bushings 53, 54 have upper and lower inward extending clevises 56, carrying clevis pins 57 mounted perpendicular to the upward and aft sloping plane of the bushings 53, 54. From the pins 57, rigid support arms 58, which may be eye-ended steel rods, extend parallel and inward to upper and lower central mounting pins 59, bolted into the upward-and-aft-sloping forward surface of a center line mounting bracket 60 at the forward end of the vehicle structure $b$. Diagonal tension struts 62, which may be simple tension springs or shock-absorbing devices containing springs, are mounted to extend between the lower pins 59 at the brackets 60 and the pins 57 at the upper bushing clevises 56.

The arms 58, jointed by the pins 57, 59 between the center line mounting bracket 60 and the steering bushings 53, 54, thus provide a parallelogram linkage, whose upward deflection under load is limited and controlled by the tension spring struts 62. This parallelogram linkage will deflect only in the upward and aft sloping plane so provided.

The spring rate of the tension struts 62 may be readily varied, in a manner which some users may consider desirable. However, this embodiment functions precisely in the same manner as the embodiment of FIGS. 1, 2 and 3 in preserving the turning stability of the snowmobile regardless of deflection.

It is contemplated that other variations of the present invention may be made which, from this disclosure, will be apparent to persons skilled in the art.

We claim:

1. A stability-preserving steering suspension for snowmobiles and the like, comprising
   a pair of support arm means projecting outward from the central vertical plane of symmetry of the snowmobile,
   each comprising a pair of substantially parallel, cantilever-mounted leaf springs, and
   characterized by spring resilience in an upward and aft sloping plane and extending outboard,
   a tubular steering bushing mounted by each said means and defining a steering axis in such plane,
   a steering shaft mounted in each said bushing and having means to turn the shaft,
   each shaft further having, beneath its said bushing, means to mount a ski, together with
   a ski mounted thereto,
   whereby impacts on each ski will be absorbed by the resilient deflection of its support arm means in said plane without affecting steering stability.

2. A stability-preserving steering suspension for snowmobiles and the like, comprising
   a pair of support arm means projecting outward from the central vertical plane of symmetry of the snowmobile,
   each said support arm means comprising a pair of parallel rigid members whose ends are pin-jointed, together with a diagonal spring, and
   characterized by spring resilience in an upward and aft sloping plane and extending outboard, together with
   a tubular steering bushing mounted by each said means and defining a steering axis in such plane,
   a steering shaft mounted in each said bushing and having means to turn the shaft and including at its lower end an inwardly extending portion,
   each shaft further having, beneath its said inwardly extending portion, means to mount a ski, and
   a ski mounted thereto.

* * * * *